Aug. 28, 1956          L. T. AKELEY          2,761,080

TEMPERATURE COMPENSATED MAGNETIC TACHOMETER

Filed March 1, 1954

Inventor:
Lloyd T. Akeley
by Richard E. Hosley
His Attorney an# United States Patent Office 2,761,080
Patented Aug. 28, 1956

2,761,080

TEMPERATURE COMPENSATED MAGNETIC TACHOMETER

Lloyd T. Akeley, Topsfield, Mass., assignor to General Electric Company, a corporation of New York Application March 1, 1954, Serial No. 413,341

10 Claims. (Cl. 310—97)

The present invention relates to speed indicators of the magnetic drag type and, more particularly, to improved tachometer indicators which are automatically compensated in accordance with ambient temperature conditions.

Eddy-current drag members and permanent magnet assemblies for deflecting spring-restrained pointers or dials have a long history of use in speedometer and tachometer apparatus. Largely because the conducting eddy-current drag members of such apparatus vary in conductivity with temperature and because permanent magnet strengths alter with temperature, the torque characteristics of these assemblies also change seriously with temperature and the resulting accuracies of output indications may be highly unsatisfactory. Known practices for reducing temperature-induced errors have included: the shunting of magnetic flux through members having flux-conducting characteristics which vary inversely with temperature; and the physical movement of permanent magnets and drag element relative to one another under the influence of temperature responsive bimetals.

While the aforementioned expedients for compensating have proven useful in eliminating certain error components, it has been found that shunts can rarely be selected or arranged to secure the full range of accurate compensation needed, and that suitable bimetals are most difficult to manufacture and adjust and further possess flexibilities which reduce their efficacy and reliability when severe vibrations are encountered. However, the numerous advantages of bimetal-type temperature compensators for tachometer devices have been realized in accordance with the present invention by employing unique arrangements which avoid the announced difficulties. Rather than utilizing small and separate bimetal elements which shift the positions of the tachometer drag members or permanent magnets, the permanent magnet assembly is so constructed that at least one of the sturdy mounting plates for small permanent magnets is itself a bimetal and is, additionally, part of the flux-conducting circuit for these magnets. As appears more fully hereinafter, the bimetal mounting plate is shaped and supported such that it will itself bend in a manner which varies the proximity of the affixed magnets to a conductive drag element as the temperature varies, thereby altering the permanent magnet flux linkages with the drag element to preserve accuracy despite changing drag element conductivity.

It is one of the objects of this invention to provide improved speed-indicating apparatus which maintains accuracies over an extensive range of temperatures.

Further, it is an object to provide accurate temperature-compensated tachometers which utilize simple and sturdy bimetals included as part of flux-conducting structures.

By way of a summary account of one aspect of this invention, there is provided a tachometer indicator wherein a spring-restrained conductive drag disk positions a pointer in accordance with torques developed thereon by interaction of induced currents in the drag disk with the magnetic field of a permanent magnet assembly rotated by a synchronous motor. The drag magnet assembly comprises two parallel plates to which small permanent magnets are affixed such that opposite poles of the magnets on the two plates face each other across a small gap wherein the drag disk is located. Three symmetrically disposed slender Invar posts couple the plates together in this substantially fixed parallel relationship. At least one of the two plates is comprised of two laminae, the outer lamina being of Invar and the inner of nickel. In addition, a strip of nickel steel, the permeability of which varies with temperature, is positioned in a flux-shunting relationship with the permanent magnets on one of the plates. Increasing temperatures cause the nickel-Invar laminated plate to curve or bulge in a direction which narrows the gap between the oppositely-disposed magnets, this curvature being facilitated by the somewhat flexible Invar posts. Compensation characteristics of the bimetal plate and nickel steel shunt are made complementary to one another to eliminate torque errors with temperature variations, and the dimensions of the Invar posts are substantially unaffected by temperature fluctuations.

Although the features of this invention which are believed to be novel are set forth in the appended claims, greater detail of the invention itself and the further objects and advantages thereof may be comprehended readily through reference to the following description taken in connection with the accompanying drawing, wherein:

Figure 1:
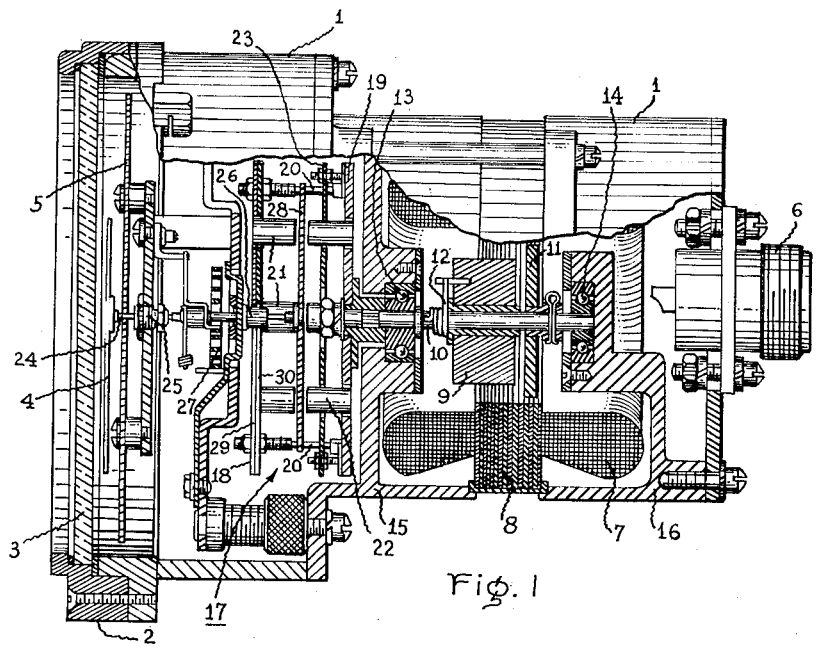
Figure 1 is a section view of a tachometer indicator embodying the teachings of this invention.

As is evident from the illustration in Figure 1, a suitable tachometer indicator may be of conventional design in several respects. The instrument is enclosed by a casing 1 which cooperates with a front flange 2 and a window glass 3 through which the angularly movable pointer 4 may be read against an indicia-bearing dial 5. An electrical connector 6 admits electrical signals from a remote tachometer generator to the three-phase stator windings 7 of a synchronous motor which further includes stator laminations 8, a permanent magnet rotor 9 mounted on a rotor shaft 10, and a hysteresis disk 11 secured to the rotor shaft. Torque is transmitted from the rotor to the shaft by a drive spring 12, and the rotor shaft is free to revolve in the bearings 13 and 14 mounted in motor end shields 15 and 16, respectively, which form part of the overall casing. One end of the motor shaft extends through the front end shield 15 and supports the drag magnet assembly 17, the latter comprising two substantially circular and parallel plates 18 and 19 which are spaced apart by three thin and somewhat flexible posts 20, preferably made of Invar or another material which does not change dimensions appreciably under changing ambient temperature conditions.

Drag magnet assembly 17 may be considered to be comprised of two magnet units, a front magnet unit including plate 18 and six short permanent magnets 21 staked thereto symmetrically and normally and projecting in a rearward direction, and a rear magnet unit including plate 19 and six short permanent magnets 22 staked thereto symmetrically and normally and projecting forward such that the magnets of both units are disposed opposite one another across a small air gap and with opposite magnetic poles facing. The rear magnet unit also includes a temperature compensator in the form of a special alloy shunt disk 23 mounted relative to plate 19 and shaped to fit around permanent magnets 22.

Pointer 4 is driven by its shaft 24 which is supported collinearly with motor shaft 10 in bearings 25 and 26, this pointer shaft 24 being angularly restrained by a spiral spring 27 and angularly driven by the attached conductive eddy-current disk 28 positioned in the narrow gap between the set of permanent magnets 21 and 22. As the magnet assembly 17 is rotated at various speeds by the synchronous electric motor, the high intensity permanent magnet flux fields existing in the gap between the front and rear sets of magnets cuts the relatively stationary conductive disk, with the result that eddy currents are generated in the disk. In turn, the magnetic fields produced by these eddy currents react with the permanent magnet fields to impose torques which deflect the disk angularly against restraining spring 27 in proportion to the speeds of rotation of the fields involved and the strengths of the fields involved.

Front magnet unit plate 18 is comprised of two laminae, the outer lamina 29 being of a low or negative thermal expansion material and the inner lamina 30 being of a relatively high thermal expansion material. In addition to being good elements of a temperature-responsive bimetal by virtue of these differing expansion characteristics, laminae 29 and 30 are also selected from materials which are excellent flux-conductors. Illustrative of suitable laminae are one of Invar, corresponding to element 29, and one of substantially pure nickel, corresponding to element 30. The various grades of Invar customarily include minute percentages of carbon and manganese, with large percentages of nickel and iron, and such compositions evidence substantially no expansion over temperature ranges of the order encountered in the expected tachometer applications. Flux return paths for the small permanent magnets should include the plates 18 and 19, to realize the maximum field strengths in the gap wherein the eddy-current disk is positioned, and the high flux-conductivity or low-reluctance of the laminated plate 18 is distinctly advantageous in this respect. With increasing temperature, the lamina 30 expands more than lamina 29, whereupon the plate 18 becomes curved inward toward disk 28 and plate 19. Permanent magnets 21 are thus moved closer to magnets 22, and the strengths of permanent magnet flux in the air gap between these sets of magnets increase by amounts which offset the effects of high temperatures upon the critical parts of the tachometer structure. In this last connection, it has been found that the net significant effects of increased temperature upon tachometer errors are negative, that is, the plot of percentage errors of output indications versus increasing temperature for an uncompensated tachometer has a negative slope. The reasons for this appear to be as follows: first, resistivity or conductivity of the drag disk 28 increases with heightened temperature, thereby lowering the torque available to drive pointer 4; second, permanent magnets 21 and 22 are lowered in strength when the temperature rises, thereby further reducing the torque impressed upon pointer 4; third, if posts 20 are of a material having a positive temperature expansion, the air gap between magnets 21 and 22 increases with temperature to occasion an additional reduction of torque influencing the pointer; and, fourth, restraining spring 27, which is ordinarily made of phosphor bronze, becomes weaker as the temperature is elevated, whereupon the pointer tends to deflect more than it should. The fourth-noted factor is less than the first and second factors, such that the net pointer torque tends to lessen as ambient temperature increases. Accordingly, the bimetal compensator must operate to increase torques as the ambient temperature rises, and must just overcome the net error of the several errors mentioned.

Particularly advantageous and important is the construction whereby the bimetal itself serves as the mounting plate and flux return path for the small permanent magnets. Not only is this a highly rugged arrangement which precludes damage under conditions of severe vibration, but it entails a minimum number of simply-fabricated parts which may be assembled readily and without intricate adjustments.

Figure 2:
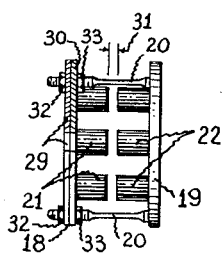
Figure 2 is a partly sectioned side view of one preferred drag magnet assembly.
Figure 3:
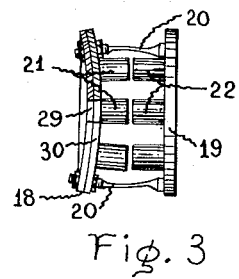
Figure 3 illustrates partly in section a somewhat exaggerated drag magnet assembly curvature of the assembly of Figure 2 at a high temperature.
Figure 4:
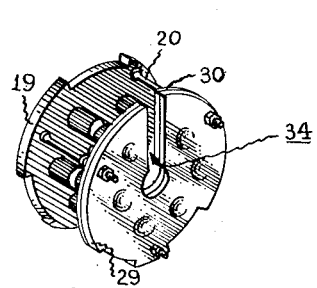
Figure 4 depicts a substantially circular plate configuration for the drag magnet assembly.

In Figures 2, 3, and 4, there are viewed drag magnet assemblies similar to that in the apparatus of Figure 1, the same reference characters being employed to identify corresponding parts. At moderate or low temperatures, plate 18 has the substantially flat shape illustrated in Figure 2 preserving that gap 31 between the sets of permanent magnets which was pre-set by adjustment of lock nuts 32 and 33 on the threaded spacers or posts 20. Figure 3 depicts the same assembly at a high temperature at which the plate 18 has been curved inward to narrow the gap between the sets of magnets, this curvature being exaggerated to facilitate an understanding of the action taking place. The plate curvature is a bulging or somewhat spherical one, such that the plate assumes a concave shape which is similar to part of the surface of a sphere rather than of a cylinder. Changes in the shape of the plate 18 are aided by the lateral flexibility of posts 20, a slight bending of the posts occurring when plate 18 is deformed.

Figure 5:
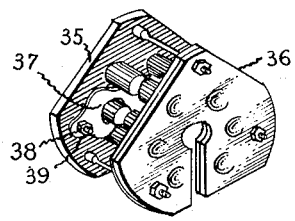
Figure 5 shows a modified and preferred plate configuration.

Figure 4 illustrates the general circularity of plates 18 and 19 and shows the manner in which plate 18 may be slotted, at 34, to admit the pointer shaft 24 and its attached drag disk 28. In Figure 5, the configuration of end plates, such as 35 and 36, has been modified to a delta-like shape, which minimizes the weight of the drag magnet assembly by the elimination of such material as is not required to support the magnets, to move the permanent magnets when bimetal bending action occurs, or to aid in the production of suitable concave curvatures which make temperature compensations possible. Nickel-steel shunt compensator 23 in Figure 1 may be similar to shunt 37 shown in Figure 5, it being apparent there that the shunt material which increases its reluctance with temperature elevations will by-pass fluxes between the adjacent permanent magnets by varying amounts which will tend to reduce variations in the strength of flux across the air gap between the two sets of magnets. Nuts such as 38 on threaded shafts such as 39 provide for movement of the shunt axially along one of the sets of magnets, thereby affording a certain amount of adjustment in the shunt-type compensation.

It has been found that a temperature compensation arrangement constructed in accordance with the present teachings produces a nearly linear compensation which is of an opposite sense to the nearly linear temperature error characteristic of an uncompensated tachometer apparatus. By way of illustration, an instrument such as that of Figure 1 will have an uncompensated percentage error which varies substantially linearly from about +7.8 per cent to about −4.4 per cent over a temperature range from −52.5 degrees C. to +70 degrees C. Appropriately, the laminated plate 18 will curve in a manner which linearly counteracts such errors, and shunt 23 has a further compensation characteristic which, although not perfectly linear, aids in reducing the net percentage errors to negligible values.

Magnetic flux in the permanent magnet drag assembly is maintained at maximum strength because of the low magnetic reluctance of the laminated plate 18, as has been noted previously. Each of the small permanent magnets 21 and 22 is axially polarized, and oppositely-disposed magnets are oppositely polarized, hence flux travels linearly through the magnets and across the air gap between them. Plates 18 and 19 conduct the flux from each oppositely-disposed pair of magnets to other adjacent such sets which have the reverse axial polarization, such that full circular flux paths are afforded and maximum field strengths may be experienced across the air gap. Bimetal compensation is thus accomplished without addition of further parts and without reduction in field strengths.

Teachings of this invention are applicable to constructions other than the specific ones selected for illustration. For example, plate 18 and magnets 21 thereon may cooperate with a simple spaced magnetic return path rather than with a second set of permanent magnets. Also, shunt compensators may be dispensed with an apparatus wherein the bimetal compensation alone satisfactorily overcomes temperature-induced errors. Spacers or posts 20 may be flattened or otherwise shaped and distributed to facilitate bulging of the laminated plate, or alternatively, these posts may be joined with the laminated plate by spherical-ended nuts or other means which permit relative tilting without appreciable angular displacements about the axis of rotation of the drag magnet assembly. Although the conductive drag element 28 has been shown as a flat disk, other arrangements would enable the use of cup-shaped elements which have been popular in tachometer constructions. The bimetal plate may include more than two laminae, and only one of the laminae need be constructed of a low-reluctance magnetic material.

Accordingly, while preferred embodiments of this invention have been referred to, it will occur to those skilled in the art that numerous modifications and substitutions may be accomplished without departure in spirit or scope from the invention as set out in the appended claims.

What I claim as new and desire to secure by letters Patent of the United States is:

1. Magnetic apparatus comprising a conductive member mounted for angular movement, a laminated member including at least one lamina of a flux-conducting magnetic material having a first thermal expansion characteristic and at least another lamina having a second and different thermal expansion characteristic, magnetized means supported by said laminated member with said one lamina in low reluctance relation to magnetic poles of said magnetized means, and means mounting said laminated member for relative angular movement in relation to said conductive member and disposing said magnetized means in inductive relationships to said conductive member which vary with temperature.

2. Magnetic apparatus comprising a conductive member mounted for angular movement, a laminated mounting plate including at least one lamina of a flux-conducting magnete material having a first thermal expansion characteristic and at least another lamina having a different thermal expansion characteristic, permanent magnet means supported by said laminated plate such that said one lamina forms low reluctance magnetic paths between magnetic poles of said permanent magnet means, means rotatable in relation to said conductive member, and means supporting said plate on said rotatable means with said permanent magnet means disposed in iuductive relation to said conductive member, whereby said plate moves said magnet means relative to said conductive member in response to temperature variations.

3. Magnetic apparatus comprising a substantially flat laminated mounting plate including at least one lamina of a flux-conducting magnetic material having a first thermal expansion characteristic and at least another lamina having a different thermal expansion characteristic, axially-polarized elongated permanent magnets supported by said plate normally to said plate and in flux-conducting relation to said one lamina, means for rotating said plate about an axis, a conductive member angularly movable about said axis and disposed in inductive relation to said magnets, and means mounting said plate on said rotating means to permit thermal curvatures of said plate which move said magnets in relation to said conductive member.

4. Magnetic apparatus comprising a substantially flat laminated plate including at least one lamina of a flux-conducting magnetic material having a first thermal expansion characteristic and at least another lamina having a different thermal expansion characteristic, a plurality of substantially cylindrical axially-polarized permanent magnets supported by said plate normally to said plate and in low reluctance relation to said one lamina, means for rotating said plate about an axis, a conductive disk angularly movable about said axis and disposed in inductive relation to said magnets, and means mounting said plate on said rotating means to permit curvatures of said plate and movements of said magnets which vary said inductive relation when temperature variations occur.

5. Magnetic apparatus comprising a pair of substantially flat flux-conducting plates each having a set of axially-polarized cylindrical magnets affixed normally thereto, at least one of said plates including at least one lamina of flux-conducting magnetic material having a first thermal expansion characteristic and at least another lamina having a different thermal expansion characteristic, means mounting said plates for angular movement in parallel relationship about an axis and with said sets of magnets oppositely disposed across a narrow air gap, and a conductive member disposed in said air gap for angular movement about said axis.

6. Magnetic apparatus responsive to the speed of a rotatable member comprising a pair of substantially flat flux-conducting plates each having a set of axially-polarized cylindrical magnets affixed normally thereto, at least one of said plates including at least one lamina of flux-conducting magnetic material having a first thermal expansion characteristic and at least another lamina having a different thermal expansion characteristic, means mounting said one of said plates in a parallel relation to the other of said plates and with said sets of magnets oppositely disposed across a narrow air gap, said mounting means permitting said one of said plates to curve under the influence of temperature variations, means coupling said other of said plates for rotation with said rotatable member, and a conductive member disposed in said air gap for angular movement responsive to the influence of said magnets.

7. Magnetic apparatus responsive to the speed of a rotatable member comprising a pair of substantially flat flux-conducting plates each having a set of axially-polarized elongated magnets affixed normally thereto, at least one of said plates including at least one lamina of flux-conducting magnetic material having a first thermal expansion characteristic and at least another lamina having a different thermal expansion characteristic, at least three symmetrically-arranged post members mounting said one of said plates in a parallel relation to the other of said plates and with said sets of magnets oppositely disposed across a narrow air gap, said post members being coupled with said one of said plates to permit said one of said plates to curve substantially spherically under the influence of increasing temperature, means coupling said other of said plates for rotation with said rotatable member, and a conductive disk disposed in said air gap for angular movement responsive to the rotated fields of said magnets.

8. Magnetic apparatus responsive to the speed of a rotatable member comprising a pair of substantially flat flux-conducting plates each having permanent magnet means projecting normally from one side thereof and polarized in said normal direction, at least one of said plates including at least one lamina of a flux-conducting material having a first thermal expansion characteristic and at least another lamina having a different thermal expansion characteristic, the lamina having the greater thermal expansion being positioned nearer the side of said one of said plates from which said magnet means projects, means mounting said one of said plates on said other of said plates in a substantially parallel relation to the other of said plates and with said magnet means on said plates oppositely disposed across a narrow air gap, said mounting means permitting said one of said plates to curve toward said other of said plates under the influence of increasing temperatures, means coupling said other of said plates for rotation with said rotatable member, and a conductive member disposed in said air gap for angular movement responsive to the rotated fields of said magnet means.

9. Magnetic apparatus responsive to speed of a rotatable member comprising a pair of substantially flat flux-conducting plates each having permanent magnet means projecting normally from one side thereof and polarized in said normal direction, at least one of said plates including at least one lamina of a flux-conducting material having a first thermal expansion characteristic and at least another lamina having a different thermal expansion characteristic, the lamina having the greater thermal expansion being positioned nearer the side of said one of said plates from which said magnet means projects, at least three post members near the peripheries of said plates mounting said one of said plates in a substantially parallel relation to the other of said plates and with said magnet means on said plates oppositely disposed across a narrow air gap, said post members having substantially zero thermal expansion and permitting said one of said plates to curve inward toward said other of said plates with a substantially spherical curvature as temperature increases, means coupling said other of said plates for rotation with said rotatable member, and a conductive disk disposed in said gap for angular movement about the axis of rotation of said plates.

10. Magnetic apparatus responsive to speed of a rotatable member comprising a pair of substantially flat flux-conducting plates each having a set of axially-polarized cylindrical permanent magnets affixed normally to one side thereof, one of said plates having a first lamina of flux-conducting magnetic material having a first thermal expansion characteristic and a second lamina or flux-conducting magnetic material having a different and greater thermal expansion characteristic, said second lamina being nearer the side of said one plate on which a set of said magnets is affixed, at least three posts having substantially zero thermal expansion mounting said one plate in a substantially parallel relation to the other of said plates near the peripheries thereof and with said sets of magnets oppositely disposed across a narrow air gap, said posts having lateral flexibility which permits said one plate to curve substantially spherically toward said other plate with increasing temperature, adjustable flux shunting means in proximity with one of said sets of magnets to shunt decreasing amounts of flux away from said air gap as temperature increases, means coupling said other plate for rotation with said rotatable member, and a conductive disk disposed in said air gap for angular movement responsive to the rotated fields of said sets of magnets.

References Cited in the file of this patent

UNITED STATES PATENTS

| | | |
|---|---|---|
| 1,415,079 | Wood | May 9, 1922 |
| 1,672,189 | Zubaty | June 4, 1928 |
| 2,638,558 | Rankin | May 12, 1953 |